United States Patent [19]

Horiuchi et al.

[11] Patent Number: 4,920,857
[45] Date of Patent: May 1, 1990

[54] HYDRAULIC PRESSURE BOOSTER

[75] Inventors: Makoto Horiuchi, Ueda; Yoshitaka Miyakawa; Kazuya Sakurai, both of Wako, all of Japan

[73] Assignees: Nissin Kogyo Kabushiki Kaisha, Ueda; Honda Giken Kogyo Kabushiki Kaisha, Tokyo, both of Japan

[21] Appl. No.: 206,783

[22] Filed: Jun. 15, 1988

[30] Foreign Application Priority Data

Jun. 16, 1987 [JP] Japan .................................. 62-149454
Jun. 16, 1987 [JP] Japan .................................. 62-149455
Jun. 16, 1987 [JP] Japan .................................. 62-149457

[51] Int. Cl.$^5$ .............................................. F15B 9/10
[52] U.S. Cl. .................................... 91/373; 91/376 R; 60/547.1
[58] Field of Search ...................... 91/376 R, 370, 372, 91/373; 60/547.1

[56] References Cited

U.S. PATENT DOCUMENTS

| | | | |
|---|---|---|---|
| 3,677,138 | 7/1972 | Goscenski | 91/373 |
| 3,979,912 | 9/1976 | Kuromitsu | 91/373 X |
| 4,642,990 | 2/1987 | Mizusawa et al. | 91/376 R X |

Primary Examiner—Edward K. Look
Attorney, Agent, or Firm—Armstrong, Nikaido, Marmelstein, Kubovcik & Murray

[57] ABSTRACT

In a hydraulic pressure booster comprising a booster piston slidably fitted in a booster cylinder coupled to a rear end of a master cylinder, the piston having at a leading end thereof an output rod abutting against a rear end of a master piston slidably fitted in the master cylinder, an inlet valve interposed between an output hydraulic oil chamber defined to face a back surface of the booster piston and an input hydraulic oil chamber leading to a hydraulic pressure supply source, the inlet valve being opened in response to an advancing movement, relative to the booster piston, of a valve piston connected to an operating member and slidably fitted in the booster piston, an outlet valve interposed between the output hydraulic oil chamber and an outlet chamber leading to an oil tank, said outlet valve being adapted to be closed in response to the advancing movement of the valve piston relative to the booster piston, and a reaction mechanism provided between the valve piston and the output rod for transmitting an operational reaction force of the output rod to the valve piston, the reaction mechanism comprises a reaction piston slidably fitted in the valve piston in such a manner that a front end thereof is capable of abutting against either of the output rod and the booster piston integral with the output rod, and a hydraulic pressure of the output hydraulic oil chamber acting on a back surface of the reaction piston, and an operation-starting set spring interposed between the valve piston and the reaction piston for biasing the reaction piston rearwardly relative to the valve piston.

6 Claims, 4 Drawing Sheets

HYDRAULIC PRESSURE BOOSTER

BACKGROUND OF THE INVENTION

1. Field Of The Invention

The present invention relates to a hydraulic pressure booster comprising a booster piston slidably fitted in a booster cylinder and having at its leading end an output rod abutting against a rear end of a master piston slidably fitted in a master cylinder, an inlet valve interposed between an output hydraulic oil chamber defined to face a back surface of the booster piston and an input hydraulic oil chamber leading to a hydraulic pressure supply source and adapted to be opened in response to the advancing movement, relative to the booster piston, of a valve piston connected to an operating member and slidably fitted in the booster piston, an outlet valve interposed between the output hydraulic oil chamber and an outlet chamber leading to an oil tank and adapted to be closed in response to the advancing movement of the valve piston relative to the booster piston, and a reaction mechanism provided between the valve piston and the output rod for transmitting an operational reaction force of the output rod to the valve piston.

2. Description Of The Prior Art

Such hydraulic pressure booster is conventionally known, for example, from Japanese patent application Laid-open No. 191863/85.

However, there is a play produced in each of portions arranged in a power transmitting line leading to the output rod of the hydraulic pressure booster in an inoperative condition. It is desirable that a reaction mechanism transmits an operational reaction force to the valve piston after elimination of such play, but the reaction mechanism in the prior art do not have such a function.

SUMMARY OF THE INVENTION

The present invention has been accomplished with such circumstances in view, and it is an object of the present invention to provide a hydraulic pressure booster comprising a reaction mechanism designed to transmit an operational reaction force after elimination of plays in individual portions.

To attain the above object, according to the present invention, there is provided a hydraulic pressure booster comprising a booster piston slidably fitted in a booster cylinder coupled to a rear end of a master cylinder, the piston having at a leading end thereof an output rod abutting against a rear end of a master piston slidably fitted in the master cylinder, an inlet valve interposed between an output hydraulic oil chamber defined to face a back surface of the booster piston and an input hydraulic oil chamber leading to a hydraulic pressure supply source, the inlet valve being opened in response to an advancing movement, relative to the booster piston, of a valve piston connected to an operating member and slidably fitted in the booster piston, an outlet valve interposed between the output hydraulic oil chamber and an outlet chamber leading to an oil tank, the outlet valve being adapted to be closed in response to the advancing movement of the valve piston relative to the booster piston, and a reaction mechanism provided between the valve piston and the output rod for transmitting an operational reaction force of the output rod to the valve piston, wherein the reaction mechanism comprises a reaction piston slidably fitted in the valve piston in such a manner that a front end thereof is capable of abutting against either of the output rod and the booster piston integral with the output rod, and a hydraulic pressure of the output hydraulic oil chamber acting on a back surface of the reaction piston, and an operation-starting set spring interposed between the valve piston and the reaction piston for biasing the reaction piston rearwardly relative to the valve piston.

With the above construction, by driving the valve piston forwardly to open the inlet valve and close the outlet valve and supplying a hydraulic pressure into the output hydraulic oil chamber, the booster piston is operated to advance, thereby providing the advancing movement of the master piston, so that a hydraulic output pressure from the master cylinder is increased rapidly irrespective of an input level, resulting in elimination of plays in the individual portion of a loading system. Moreover, when an advancing force provided by the hydraulic pressure acting on the back surface of the reaction piston overcomes a retreating force provided by the operation-starting set spring, the reaction piston abuts against the output rod, so that the operational reaction force of the output rod is transmitted through the reaction mechanism to the valve piston.

The above and other objects, features and advantages of the invention will become apparent from reading of the following description of the preferred embodiments, taken in conjunction with the accompanying drawings.

BRIEF DESCRIPTION OF THE DRAWINGS

FIG. 1 is a side view in longitudinal section of a hydraulic pressure of the first embodiment;

FIG. 2 is an enlarged view of the detail of FIG. 1;

FIG. 3 is a diagram of an input-output hydraulic pressure characteristic; and

DESCRIPTION OF THE PREFERRED EMBODIMENTS

Figure 1:
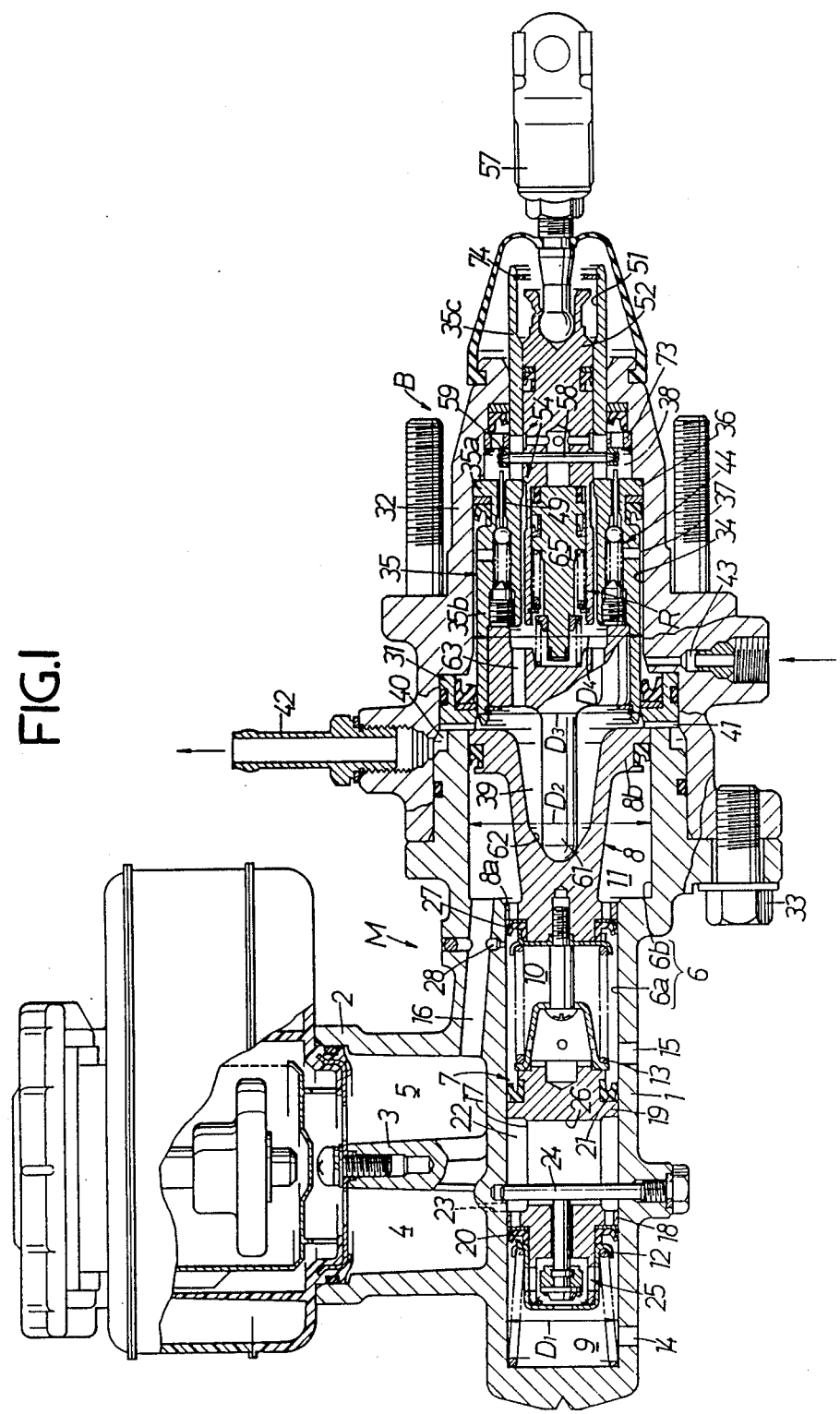
FIGS. 1 to 3 illustrate a first embodiment of the present invention.

A first embodiment of the present invention will now be described with reference to the accompanying drawings. Referring first to FIG. 1, a cylinder body 1 of a tandem type master cylinder M for a dual-type hydraulic brake in an automobile has an oil tank 2 formed at its upper portion. A lower interior portion of the oil tank 2 is divided by a partition wall 3 into a front oil reservoir 4 and a rear oil reservoir 5.

The cylinder body 1 is provided with a cylinder bore 6 having a closed front end. The cylinder bore 6 comprises a smaller diameter bore portion 6a extending immediately below the oil tank 2, and a larger diameter bore portion 6b connected to a rear end of the smaller diameter bore portion 6a, both the bore portions being connected via a step with each other. The whole of a front master piston 7 and a front end. i.e., smaller diameter piston portion 8a of a rear master piston 8 are slidably fitted in the smaller diameter bore portion 6a, while a rear end, i.e., larger diameter piston portion 8b of the rear master piston 8 is slidably fitted in the larger diameter bore portion 6b. A front hydraulic oil chamber 9 is defined between a front end wall of the cylinder bore 6 and the front master piston 7, and a rear hydraulic oil chamber 10 is defined between the front master piston 7 and the rear master piston 8. Further, a supplement oil chamber 11 is defined between the smaller diameter piston portion 8a and the larger diameter piston portion 8b of the rear master piston 8. In addition, a first return spring 12 is contained in the front hydraulic oil chamber 9 to bias the front master piston 7 rearwardly, and a second return spring 13 is contained in the rear hydraulic oil chamber 10 and has a set load established at a smaller value than that of the first return spring 12 to bias both the master pistons 7 and 8 away from each other. These return springs 12 and 13 cause the two master pistons 7 and 8 to advance and retreat in an interlocking manner.

The cylinder body 1 is provided with a first output port 14 normally communicating with the front hydraulic oil chamber 9, and a second output port 15 normally communicating with the rear hydraulic oil chamber 10, and hydraulic brake circuits which are not shown are connected to the output ports 14 and 15. Therefore, each of the hydraulic brake circuits is supplied with a hydraulic braking pressure corresponding to the pressurization of the front hydraulic oil chamber 9 and the rear hydraulic oil chamber 10. The supplement oil chamber 11 is connected to the rear oil reservoir 5 through an oil passage 16 made in the cylinder body 1.

The master piston 7 is provided with a pair of lands 18 and 19 with an axial distance therebetween and an annular groove 17 is interposed therebetween. Cap-like seals 20 and 21 are fitted over the corresponding lands 18 and 19 in slidable contact with an inner surface of the smaller diameter bore portion 6a, thereby defining an annular oil chamber 22 between both the lands 18 and 19. Moreover, the land 18 between the front hydraulic oil chamber 9 and the oil chamber 22 and the cap-like seal 20 fitted over the land 18 are designed to permit flowing of working oil from the oil chamber 22 into the front hydraulic oil chamber 9 when the front hydraulic oil chamber 9 is depressurized more than as is the oil chamber 22. The cylinder body 1 is perforated with an oil hole 23 for allowing the oil chamber 22 to communicate with the front oil reservoir 4.

A value mechanism 25 is disposed in front of the front master piston 7 for permitting and cutting off communication between the front hydraulic oil chamber 9 and the oil chamber 22, and is operable to be opened and closed by a stopper bolt 24 passed through the piston 7 in one diametrical line and fixed to the cylinder body 1. The valve mechanism 25 is urged and opened by the stopper bolt 24 when the front master piston 7 is returned to a retreat limit. An elongated hole 26 is made in the front master piston 7 to extend along one diametrical line at a piston between both the lands 18 and 19, and the stopper bolt 24 is inserted through the elongated hole 26.

A cap-like seal 27 is fitted over the front end, i.e., the smaller piston portion 8a of the front master piston 8 in slidable contact with the inner surface of the smaller diameter bore portion 6a. The cap-like seal 27 and the smaller diameter piston portion 8a are designed to permit flowing of the working oil from the supplement oil chamber 11 into the rear hydraulic oil chamber 10 when the rear hydraulic oil chamber 10 is depressurized more than as is the supplement oil chamber 11. The cylinder body 1 is also perforated with a relief hole 28 for permitting or cutting off communication between the oil passage 16 and the rear hydraulic oil chamber 10 in cooperation with the cap-like seal 27 as the rear master piston 8 moves forwardly or rearwardly. The relief hole 28 permits communication between the oil passage 16 and the rear hydraulic oil chamber 10 when the master piston 8 has been returned to a retreat limit.

Figure 2:
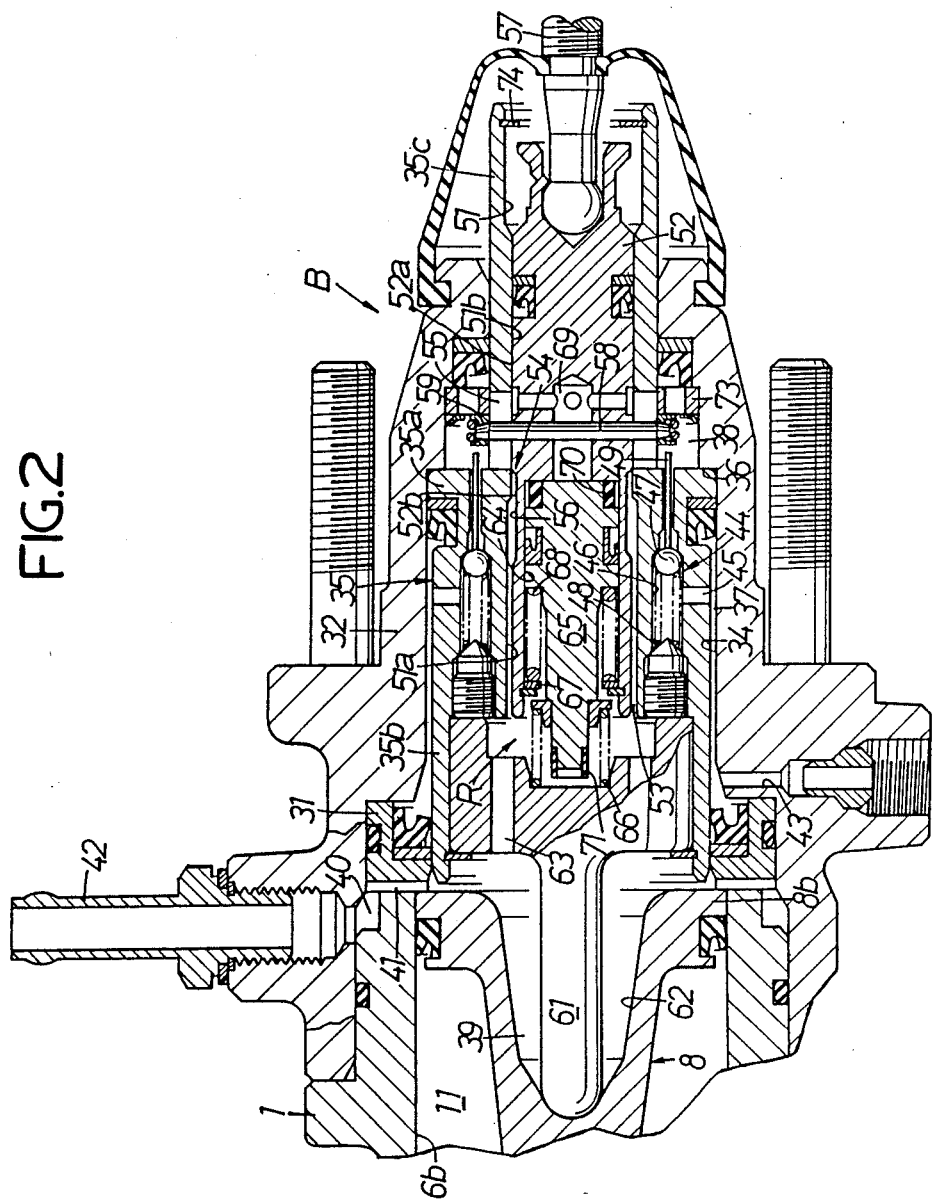

Referring also to FIG. 2, a booster cylinder 32 of a hydraulic pressure booster B is coaxially connected to the rear end of the cylinder body 1 of the master cylinder M with a guide ring 31 sandwiched therebetween, and the cylinder body 1 and the booster cylinder 32 are coupled with each other by means of a bolt 33.

Now, supposing that the diameter of the smaller diameter bore portion 6a of the cylinder bore 6 is D1; the diameter of the larger diameter bore portion 6b is D2; the inner diameter of the guide ring 31 is D3; and the diameter of a cylinder bore 34 in the booster cylinder 32 is D4, these diameters are represented by the following expression:

$$D1 < D3 < D4 < D2$$

A larger diameter piston portion 35a provided at a rear portion of a booster piston 35 is slidably fitted in the cylinder bore 34 in the booster cylinder 32. A front portion of the booster piston 35 is formed as a smaller diameter piston portion 35b which is slidably fitted in the guide ring 31. A rod portion 35c is also coaxially provided at a rear portion of the booster piston 35 to pass through a rear end wall of the booster cylinder 32 in an oil-tight manner and project rearwardly. In addition, the cylinder bore 34 is provided with a stepped portion or shoulder 36 which is abuttable against a rear end face of the larger diameter piston portion 35a to provide a retreat limit for the booster piston 35.

By inserting the booster piston 35 into the cylinder bore 34 in this manner, an annular input hydraulic oil chamber 37 is defined between the cylinder bore 34 and the booster piston 35 and between the guide ring 31 and the larger diameter piston portion 35a, and an annular output hydraulic oil chamber 38 is defined between the larger diameter piston portion 35a and a rear end wall of the booster cylinder 32 to surround the booster piston 35. Thus the input hydraulic oil chamber 37 and the output hydraulic oil chamber 38 are disposed to face to opposite surfaces of the larger diameter piston portion 35a of the booster piston 35, respectively. The pressure receiving area of the booster piston 35 exposed to the output hydraulic oil chamber 38 is set to be larger than its pressure receiving area exposed to the input hydraulic oil chamber 37.

An outlet chamber 39 is defined between the larger diameter piston portion 8b of the rear master piston 8 in the master cylinder M and the smaller diameter piston portion 35b of the booster piston 35. An annular oil passage 40 is defined between the rear end of the cylinder body 1 and the booster cylinder 32 and communicates with the outlet chamber 39 through a groove 41 radially provided in a front end face of the guide ring 31. Further, a connecting pipe 42 is connected to the booster cylinder 32 to lead to the annular oil pasage 40 and is also connected to the oil reservoir 2 or to a hydraulic pressure supply source which is not shown, through a line which is not shown. It follows that the outlet chamber 39 leads to the oil reservoir 2 or the hydraulic pressure supply source which is not shown.

The booster cylinder 32 is perforated with an oil supply passage 43 leading to the input hydraulic oil chamber 37, and connected to the oil supply passage 43 is a hydraulic pressure supply source (not shown) which pumps out working oil of the oil tank 2 or another oil tank (not shown).

A plurality of inlet valves 44 are provided in the booster piston 35 in a manner to enable communication between the input hydraulic oil chamber 37 and the output hydraulic oil chamber 38. Each of the inlet valves 44 is constructed into a normally closed type by a tubular valve chest 46 defined in an axial direction of the booster piston 35 on the way of an oil passage 45 connecting the input hydraulic oil chamber 37 and the output hydraulic oil chamber 38, a valve ball 47 for opening and closing the oil passage 45 in cooperation with a valve seat formed on a rear end wall of the valve chest 46, a valve spring 48 contained in the valve chest 46 to bias the valve ball 47 toward a closing position, and an operating rod 49 for urging the valve ball 47 toward an opening position against a spring force of the valve spring 48. Moreover, the operating rod 49 is axially movably fitted in the booster piston 35 and projected at its rear end into the output hydraulic oil chamber 38. The amounts of individual operating rods 49 projected into the output hydraulic oil chamber 38 are set at slightly different values.

The booster piston 35 is coaxially perforated with a guide hole 51 extending over the entire length thereof. The guide hole 51 includes a larger diameter hole portion 51a extending from a front end of the guide hole 51 to a middle portion of the larger diameter piston portion 35a of the booster piston 35, and a smaller diameter hole portion 51b connected to the larger diameter hole portion via a stepped portion, with a valve piston 52 being slidably received in the guide hole 51 in slidable contact with an inner surface of the smaller diameter hole portion 51b. An annular oil chamber 53 is defined between an inner surface of the larger diameter hole portion 51a and an outer surface of the valve piston 52, and an outlet valve 54 is disposed between this oil chamber 53 and the output hydraulic oil chamber 38.

The outlet valve 54 is comprised of a larger diameter portion 52a and a smaller diameter portion 52b provided on the valve piston 52 with a step therebetween to permit and cut off communication between the oil chamber 53 and a pair of oil holes 55 provided along one diametrical line at the base of a rod portion 35c of the booster piston 35 in correspondence to the smaller diameter hole portion 51b. The larger diameter portion 52a is adapted to close the oil holes 55, and the smaller diameter portion 52b is adapted to permit communication between the oil chamber 53 and the oil holes 55. In this embodiment, an annular groove 56 is provided in the outer surface of the valve piston 52 to form the smaller diameter portion 52b. Such outlet valve 54 is slightly open when the booster piston 35 is in a position shown in FIG. 2 relative to the valve piston 52, and the degree of opening thereof increases as the booster piston 35 moves relatively forwardly from that position.

A push rod 57 as an operating member is connected to a rear end of the valve piston 52 and also operatively connected to a brake pedal which is not shown. This enables the valve piston 52 to advance in response to the depression of the brake pedal.

In the output hydraulic oil chamber 38, a pin 58 is fitted and fixed to the valve piston 52 so as to lie at right angles to the axis of the valve piston 52, with opposite ends of the pin 58 being passed through the corresponding oil holes 55 to project from the outer peripheral surface of the rod portion 35c. Moreover, opposite projecting ends of the pin 58 are fitted in an interlocking ring 59 surrounding the rod portion 35c. The interlocking ring 59 is disposed in an opposed relation to a rear end of the operating rod 49 of each inlet valve 44 to push the operating rod 49 in an opening direction in response to advancing movement of the valve piton 52. The oil hole 55 is made in a long extension enough to permit axial relative movement of the booster piston 35 and the valve piston 52 in a limited range.

A stopper 73 is locked on an inner wall of the booster cylinder 32 for bearing a rear end face of the interlocking ring 59, so that a retreat limit for the valve piston 52 is provided by the stopper 73 when the booster piston 35 is at its retreat limit. A cir-clip 74 for abutment against the rear end of the valve piston 52 is fitted in an inner surface of the rod portion 35c closer to its rear end to provide a retreat limit for the valve piston 52 on the way of retraction of the piston 35.

Thus, when the valve piston 52 is retreated, the outlet valve 54 is opened, and when the valve piston 52 has been received by the stopper 73 through the interlocking ring 59 at the retreat limit of the booster piston 35, the opening degree of the outlet valve 54 is at a minimum.

An output rod 61 is fixed to a front portion of the booster piston 35 and is protruded into a recess 62 provided on a back surface of the rear master piston 8 to abut against that piston 8. In addition, the output rod 61 is perforated with a communication hole 63 which permits the oil chamber 53 to communicate with the outlet chamber 39 and thus the oil tank 2 or another oil tank of a hydraulic oil supply source which is not shown.

Provided between the output rod 61 and the valve piston 52 is a reaction mechanism R for transmitting an operational reaction force of the master cylinder M to the valve piston 52. The reaction mechanism R includes a bottomed bore 64 coaxially provided in the valve piston 52 and opened to a front end face of the valve piton 52, a reaction piston 65 slidably fitted in the bottomed bore 64, a return spring 66 provided in a compressed manner between the reaction piston 65 and the output rod 61, and an operation-starting set spring 68 contained in the bottomed bore 64 to surround the reaction piston 65 and compressed between a retaining ring 67 fitted in an inner surface of the bottomed bore closer to its opened end and the reaction piston 65 for biasing the reaction piston 65 rearwardly. The valve piston 52 has a pressure passage 69 made therein to extend between the oil holes 55 and a closed end of the bottomed bore 64 in order to allow a hydraulic pressure of the output hydraulic oil chamber 38 to act on a rear end face of the reaction piston 65.

A shock-absorbing rubber member 70 is mounted on a rear end of the reaction piston 65 to moderate a shock which may be produced upon contacting of the reaction piston 65 with the valve piston 52, and a shock-absorbing rubber member 71 is mounted on a front end of the reaction piston 65 to moderate a shock which may be produced upon contacting of the reaction piston 65 with the output rod 61.

The return spring 66 exhibits a spring force for biasing the reaction piston 65 rearwardly, so that with no hydraulic pressure acting on its rear end face, the reaction piston 65 is in a state that its rear end abuts against the valve piston 52 by a spring force of the return spring 66 and hence, a rearward biasing force provided by the return spring 66 also acts on the valve piston 52 through the reaction piston 65. In addition, the operation-starting set spring 68 exhibits a spring force in a direction to cause the reaction piston 65 to move rearwardly relative to the valve piston 52.

Now, when the booster piston 35 and the valve piston 52 are at their retreat limits, the outlet valve 54 is in a slightly opened state while the inlet valves 44 are in a closed state. Moreover, the spacing between each operating rod 49 and the interlocking ring 59 is set such that upon advancing movement of the valve piston 52 relative to the booster piston 35, the outlet valve 54 is first closed and then, the inlet valve 44 is opened. Further, when the booster piston 35 and the valve piston 52 are at their retreat limits, the spacing between the front end of the reaction piston 65 in abutment against the valve piston 52 and the output rod 61 is larger than that between the interlocking ring 59 and each operating rod 49, so that upon forward movement of the valve piston 52 and the reaction piston 65 relative to the booster piston 35, the inlet valve 44 is opened before the reaction piston 65 abuts against the output rod 61. Moreover, due to slight difference in amount of operating rods 49 of individual inlet valves 44 projected into the output hydraulic oil chamber 38, the individual inlet valves 44 are opened in sequence as the interlocking ring 59 advances.

The operation of this embodiment will be described below. When the brake pedal (not shown) is not depressed, the valve piston 52 is held at the retreat limit along with the interlocking ring 59 by the spring force of the return spring 66, and the booster piston 35 is held at the retreat limit by the hydraulic pressure acting on the input hydraulic oil chamber 37. Moreover, in this state, the inlet valves 44 are closed, while the outlet valve 54 is slightly open and hence, the output hydraulic oil chamber 38 is at the atmospheric pressure.

When the brake pedal is depressed in such condition to brake the automobile, the valve piston 52 and the interlocking ring 59 are pushed forwardly by the brake pedal through the push rod 57, so that the outlet valve 54 is first closed and then, the inlet valves 44 are opened. Thus, a hydraulic pressure is introduced from the input hydraulic oil chamber 37 into the output hydraulic oil chamber 38. This causes the booster piston 35 to advance upon reception of the hydraulic pressure on its rear end face, thereby producing the advancing movement of the rear master piston 8 through the output rod 61 to start boosting operation of the master cylinder M.

Figure 3:
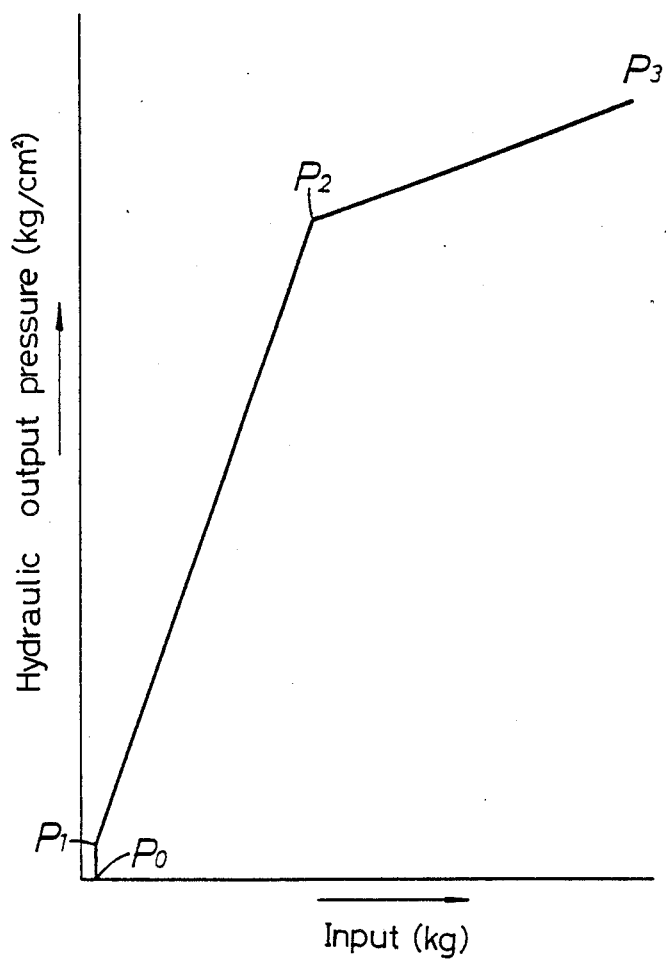

Now, at an initial stage of advancing operation of the booster piston 35, the reaction piston 65 is not in abutment against the output rod 61 and hence, no operational reaction force of the output rod 61 acts on the valve piston 52 and the push rod 57, and the output rod 61 advances regardless of the value of input from the push rod 57, so that the hydraulic output pressure from the master cylinder M abruptly rises as shown by a characteristic line $P_0$–$P_1$ in FIG. 3. This causes plays at individual portions up to the brake terminal end to be immediately eliminated.

The hydraulic pressure introduced into the output hydraulic oil chamber 38 is passed through the pressure passage 69 to act on the rear end face of the reaction piston 65, so that the reaction piston 65 is forced to advance against the spring force of the operation-starting set spring 68 until it abuts against the output 61. When the reaction piston 65 has abutted against the output rod 61 in this manner, the operational reaction force of the output rod 61 is transmitted through the reaction mechanism R to the valve piston 52 and the push rod 57. A point $P_1$ in FIG. 3 is determined by a set load of the operation-starting set spring 68.

After abutment of the reaction piston 65 against the output rod 61, the amount of movement of the booster piston 35, i.e., the hydraulic output pressure from the master cylinder M is increased at a given ratio to the input.

A point $P_2$ in FIG. 3 is a boosting limit of the hydraulic pressure booster B, and further increase in the output depends only on the input as shown by a characteristic line $P_2$–$P_3$.

When the brake pedal is released to deactivate the operation of the master cylinder M, the valve piston 52 is retreated along with the interlocking ring 59 by a resilient force of the return spring 66. With this retreating movement, the interlocking ring 59 is first moved away from the operating rod 49 to close the inlet valve 44 and then, the annular groove 56 permits communication between the oil chamber 53 and the oil holes 55 to open the outlet valve 54. When the opening of the outlet valve 54 becomes a maximum, the valve piston 52 is constrained at the retreat limit by the cir-clip 74.

Opening of the outlet valve 54 at the maximum in this manner causes the hydraulic pressure in the output hydraulic oil chamber 38 to be rapidly discharged outside therefrom, so that the booster piston 35 is promptly retreated by returning forces of the return springs 12 and 13 of the master cylinder M and the like. When the booster piston 35 has reached the retreat limit and abutted against the shoulder 36, the valve piston 52 is restricted its movement by the stopper 73 and stopped in a position more advanced than the position as determined by the cir-clip 74, whereby the opening of the outlet valve 54 is held at a minimum level.

In the above described embodiment, the annular groove 56 is provided on the valve piston 52 in order to form the smaller diameter portion 52b. But instead thereof, a front portion of the value piston 52 may be formed to be small in diameter.

With such a construction, the hydraulic output pressure from the master cylinder abruptly increases regardless of the input level, so that plays at individual portions in a loading system are eliminated. Moreover, when the advancing force provided by the hydraulic pressure acting on the back surface of the reaction piston overcomes the retreating force provided by the operation-starting set spring, the reaction piston abuts against the output rod, so that the operational reaction force of the output rod is transmitted through the reaction mechanism to the valve piston.

In addition, since the outlet valve is formed between the booster piston and the piston, the arrangement is simplified and moreover, a valve casing required in the prior art is unnecessary, leading to a decreased number of parts.

Figure 4:
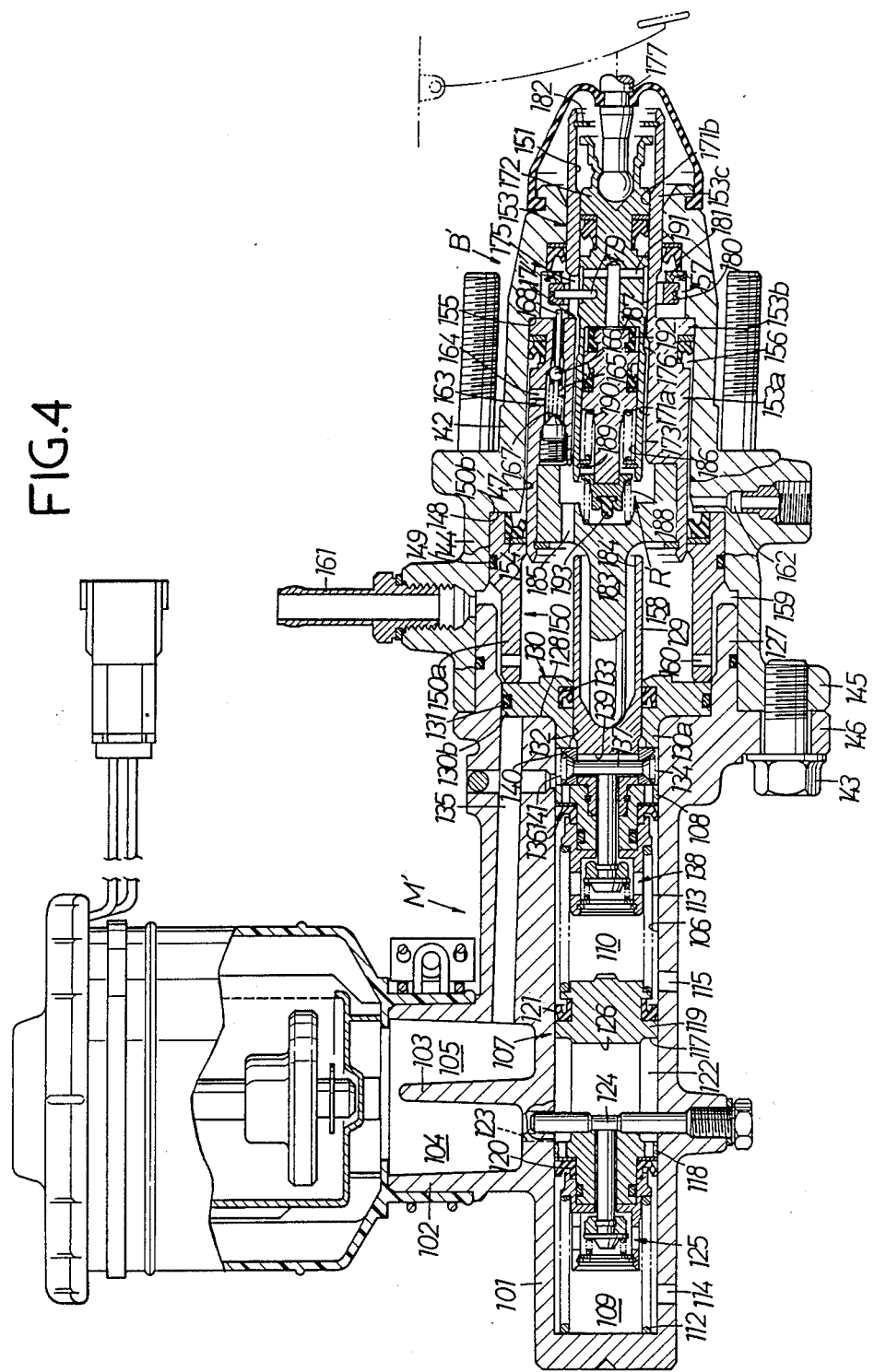
FIG. 4 illustrates a second embodiment of the present invention, shown in longitudinal section similar to FIG. 1.

A second embodiment of the present invention will be described below with reference to FIG. 4. In this second embodiment, the construction thereof is basically similar to that of the previous first embodiment, except arrangements of the guide means for the rear master piston and booster piston and their surroundings and hence, the different portions will be primarily described below.

A cylinder body 101 of a master cylinder M' is provided at its rear portion with a cylindrical connecting portion 127 projecting therefrom which is coaxial with a cylinder bore 106 and has an internal bore continuous to the bore 106 via a stepped portion 128. On the other hand, a rearwardly extending piston rod 129 is secured at its front end to a rear master piston 108, and a guide member 130 is fixed to a rear portion of the cylinder body 101 to guide the movement of the piston rod 129. The guide member 130 comprises a cylindrical fitting portion 130a fittable into a rear end of the cylinder bore 106, and a radially outwardly extruding jaw-like abutment-receiving portion 130b integrally provided at a rear end of the fitting portion 130a, with the outer diameter of the abutment-receiving portion 130b being determined such that it can be fitted into the internal bore of the portion 127. An O-ring 131 is fitted over an outer surface of the guide member 130 in contact with the internal bore of the cylindrical connecting portion 127. In addition, the guide member 130 is perforated with a support hole 132 for movable insertion of the piston rod 129 therethrough, and a sealing member 133 is fitted in an inner surface of the support hole 132 in slidable contact with an outer surface of the piston rod 129.

A supplement oil chamber 134 is defined between the guide member 130 and the rear master piston 108, and the cylinder body 101 is perforated with an oil passage 135 for permitting the supplement oil chamber 134 to communicate with a rear oil reservoir 105. A cap-like seal 136 is fitted on the rear master piston 108 in slidable contact with the inner surface of the cylinder bore 106. The cap-like seal 136 and the rear master piston 108 are designed to permit flowing of working oil from the supplement oil chamber 134, into a rear hydraulic oil chamber 110 when the rear oil chamber 110 is depressurized more than as is the supplement oil chamber 134.

A valve mechanism 138 is disposed in front of the rear master piston 108 and driven to be opened and closed by a stopper bolt 137 to permit and cut off communication between the rear hydraulic oil chamber 110 and the supplement oil chamber 134, so that the valve mechanism 138 is urged by the stopper bolt 137 into an opened state upon returning of the rear master piston 108 to its retreat limit. The stopper bolt 137 is inserted through an elongated hole 139 perforated in an axially long extension in the piston rod 129 to intersect an axis of the piston rod 129 at right angles, with opposite ends of the stopper bolt 137 projecting from the outer surface of the piston rod 129 being fixed to a cylindrical holder 140 which is disposed in the supplement oil chamber 134 to surround the piston rod 129. Moreover, the holder 140 is biased in a direction to abut against the guide member 130 by a spring 141 interposed between the holder 140 and the rear master piston 108, whereby the stopper bolt 137 is substantially fixed to the cylinder body 101.

A booster cylinder 142 of a hydraulic pressure booster B' is coaxially connected to the rear end of the cylinder body 101 of the master cylinder M', and the cylinder body 101 and the booster cylinder 142 are coupled with each other by means of a bolt 143. More specifically, a cylindrical connecting portion 144 is projected on a front portion of the booster cylinder 142 is shaped so as to be fitted into the cylindrical connecting portion 127 of the master cylinder M', and a flange 145 provided at a leading end of the cylindrical connecting portion 144 is coupled with a flange 146 provided at a base end of the cylindrical connecting portion 127 in the cylinder body 101 by means of the bolt 143.

A cylinder bore 147 is made in the booster cylinder 142 coaxially with the cylinder bore 106 of the master cylinder M'. A shoulder or stepped portion 148 is provided between the cylinder bore 147 and the cylindrical connecting portion 144 to face toward the master cylinder M'. A guide ring 150 is provided and has a back surface thereof abutted against the shoulder 148. A seal member 149 is provided on the outer surface of the guide ring 150 for contact with the inner surface of the portion 144. Particularly, the guide ring 150 is provided on its back side with an abutment surface 150b abutting against the shoulder 148. Moreover, the guide ring 150 is coaxially provided with a cylindrical abutment protrusion 150a extending toward the master cylinder M', with a front end of the abutment protrusion 150a abutting against a back surface of the guide member 130. That is, when the cylinder body 101 of the master cylinder M' is coupled with the booster cylinder 142 of the hydraulic pressure booster B' by means of the bolt 143, the guide member 130 and the guide ring 150 are clamped between the cylinder body 101 and the booster cylinder 142 and are axially abutted against each other.

A booster piston 153 is slidably fitted in the cylinder bore 147. A front portion of the booster piston 153 is formed as a smaller diameter piston portion 153a having a diameter smaller than that of a larger diameter piston portion 153b which is formed at a rear portion of the booster piston 153, the larger diameter piston portion 153b being slidably fitted in the cylinder bore 147, and the smaller diameter piston portion 153a being slidably fitted in the guide ring 150. Moreover, a sealing member 154 is fitted in the inner surface of the guide ring 150 in slidable contact with the smaller diameter piston portion 153a. In addition, a rod portion 153c is coaxially projected from the rear portion of the booster piston 153 and passed through a rear end wall of the booster cylinder 142 in an oil-tight manner to project rearwardly thereof. Further, the cylinder bore 147 is provided with a constraint shoulder 155 adapted to bear the rear end face of the larger diameter piston portion 153b to define a retreat limit for the booster piston 153.

By inserting the booster piston 153 into the cylinder bore 147 in this manner, an annular input hydraulic oil chamber 156 is defined between the inner surface of the cylinder bore 147 and the outer surface of the booster piston 153 and between the guide ring 130 and the larger diameter piston portion 153b, and an annular output hydraulic oil chamber 157 is defined between the larger diameter piston portion 153b and the rear end wall of the booster cylinder 142 to surround the booster piston 153. Thus, the input hydraulic oil chamber 156 and the output hydraulic oil chamber 157 are disposed to face to opposite surfaces of the larger diameter piston portion 153b of the booster piston 153, respectively, with the pressure-receiving area of the booster piston 153 exposed to the output hydraulic oil chamber 157 being set to be larger than its pressure-receiving area exposed to the input hydraulic oil chamber 156.

An outlet chamber 158 is defined between the guide member 130 of the master cylinder M' and the front end of the booster piston 153, with its outer periphery bordered by the abutment protrusion 150a of the guide ring 150. Also, an annular oil passage 159 is defined between the cylindrical connecting portions 127, 144 and the abutment protrusion 150a and communicates with the outlet chamber 158 through a plurality of communication holes 160 perforated in the abutment protrusion 150a. Further, a connecting pipe 161 leading to the annular oil passage 159 is connected to the cylindrical connecting portion 144 of the booster cylinder 142 and is also connected to an oil tank 102 or another oil tank of a hydraulic oil supply source which is not shown, through a line which is not shown. Thus, the outlet chamber 158 leads to the oil tank 102 or another oil tank of the hydraulic oil supply source which is not shown.

A pin 179 is fixed at one end thereof to the valve piston 172 at a place corresponding to the output hydraulic oil chamber 157 to extend radially of the valve piston 172, and is protruded at the other end thereof from the oil hole 175 into the output hydraulic oil chamber 157. Moreover, the protruded end of the pin 179 is fitted and fixed to an interlocking ring 180 surrounding the rod portion 153c. The interlocking ring 180 is disposed in an opposed relation to a rear end of an operating rod 168 of the inlet valve 163 in order to push the operating rod 168 in an opening direction upon reception of advancing movement of the valve piston 172. The oil hole 175 is defined to be long axially of the booster piston 153 so as to permit axial relative movement of the booster piston 153 and the valve piston 172 in a limited range.

A stopper 181 is locked to an outer wall of the booster piston 153 for bearing a rear end face of the interlocking ring 180, so that a retreat limit for the valve piston 172 is provided by the stopper 181 when the booster piston 153 is at its retreat limit. In addition, a cir-clip 182 is fitted to an inner surface of the rod portion 153c closer to its rear end to provide a retreat limit of the valve piston 172 during retreating movement of the booster piston 153.

An output rod 183 is fixed to the front portion of the booster piston 153 and protruded into and abuts against a recess 184 provided in the rear end face of the piston rod 129 integral with the rear master piston 108.

A reaction mechanism R' substantially similar in construction to that of the previous first embodiment is provided between the output rod 183 and the valve piston 172 for transmitting an operational reaction force of the master piston M' to the valve piston 172. A shock-absorbing member 193, which is mounted on a front end of a reaction piston 187 of the mechanism R' for moderating a shock which may be produced upon contacting of the reaction piston 187 with the output rod 183, is protruded from the center of the front end of piston 187, unlike the previous first embodiment.

When assembling such master cylinder M' and hydraulic pressure booster B', the guide member 130 disposed at the rear portion of the cylinder body 101 to guide the piston rod 129 and the guide ring 150 disposed at the front portion of the booster cylinder 142 to guide the movement of the booster piston 153 are clamped between the cylinder body 101 and the booster cylinder 142 in a state abutting against each other, by coupling the cylinder body 101 of the master cylinder M' with the booster cylinder 142 of the hydraulic pressure booster B'. Therefore, a fixing member such as a cir-clip or the like required in the prior art to fix the guide member 130 to the cylinder body 101 is unnecessary, leading to a further decreased number of parts.

The inlet valve 163 can be arranged in plurality like the first embodiment by appropriately modifying the pin 179 and ring 180.

What is claimed is:

1. A hydraulic pressure booster comprising: a booster piston slidably fitted in a booster cylinder coupled to a rear end of a master cylinder, the piston having at a leading end thereof an output rod abutting against a rear end of a master piston slidably fitted in the master cylinder; an inlet valve interposed between an output hydraulic oil chamber defined to face a back surface of the booster piston and an input hydraulic oil chamber leading to a hydraulic pressure supply source, the inlet valve being opened in response to an advancing movement, relative to the booster piston, of a valve piston connected to an operating member and slidably fitted in the booster piston; an outlet valve interposed between said output hydraulic oil chamber and an outlet chamber leading to an oil tank, said outlet valve being adapted to be closed in response to the advancing movement of said valve piston relative to the booster piston; and a reaction mechanism provided between the valve piston and the output rod for transmitting an operational reaction force of the output rod to the valve piston, wherein said reaction mechanism comprises a reaction piston slidably fitted in the valve piston in such a manner that a front end thereof is capable of abutting against either of the output rod and the booster piston integral with the output rod, and a hydraulic pressure of the output hydraulic oil chamber acting on a back surface of the reaction piston, and an operation-starting set spring interposed between the valve piston and the reaction piston for biasing the reaction piston rearwardly relative to the valve piston.

2. A hydraulic pressure booster according to claim 1, wherein said reaction piston is slidably received in a bottomed bore opened at a front end face of said valve piston, and said operation-starting set spring is contained in said bottomed bore to surround said reaction piston.

3. A hydraulic pressure booster according to claim 1, wherein said reaction piston has a shock-absorbing member mounted on a front end thereof to moderate a shock to be produced when said front end abuts against said either of the output rod and the booster piston.

4. A hydraulic pressure booster according to claim 1 or 3, wherein said reaction piston has a shock-absorbing member mounted on a rear end thereof to moderate a shock to be produced when said rear end abuts against said valve piston.

5. A hydraulic pressure booster according to claim 1, wherein a return spring is provided in a compressed manner between said reaction piston and said output rod for biasing said reaction piston rearwardly.

6. A hydraulic pressure booster according to claim 1, wherein said reaction piston is coaxially disposed within said valve piston which is coaxially disposed within said booster piston.

* * * * *